July 5, 1932.  V. THIEL  1,866,235
JUNCTION SLEEVE OR THE LIKE FOR DEEP SEA CABLES
Filed Sept. 15, 1930
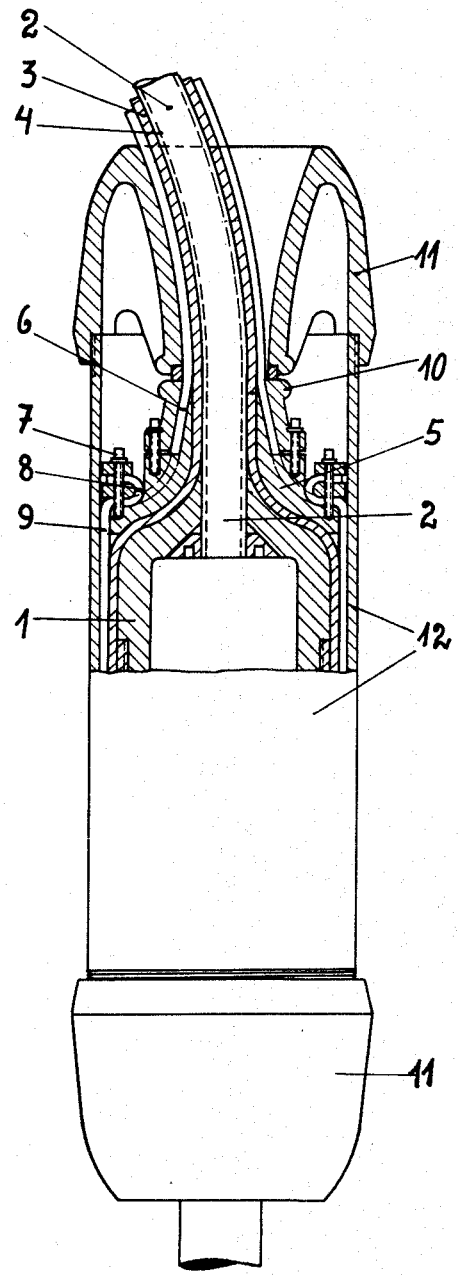
V. Thiel
INVENTOR
By: Marks &Clerc
Attys.

Patented July 5, 1932

1,866,235

UNITED STATES PATENT OFFICE

VIKTOR THIEL, OF COLOGNE-MULHEIM, GERMANY, ASSIGNOR TO FELTEN & GUILLEAUME CARLSWERK ACTIEN-GESELLSCHAFT, OF KOLN-MULHEIM, GERMANY

JUNCTION SLEEVE OR THE LIKE FOR DEEP SEA CABLES

Application filed September 15, 1930, Serial No. 482,064, and in Germany September 19, 1929.

This invention relates to junction sleeves and coil boxes with rigid pressure protecting casings for deep seas, and more particularly to the special mode of guiding and securing the armouring wires to the sleeve or box.

In deep sea junction sleeves for cables with pressure protecting casings as hitherto proposed, the casing has been either subjected to tension in an axial direction by the armouring of the cable being secured in the casing of the sleeve, or it was relieved of tensional stresses by the armouring wires of the cable ends inserted into the sleeve being led over the sleeve and connected together by welding or soldering or by being laid in the form of loops around rings and clamped thereon.

The present invention consists in this that the armouring wires of each cable end are led over the sleeve casing and are secured at the opposite end of the sleeve, e. g. in a labyrinth guide, that is to say with several bends between clamping jaws in such a manner that the pull of the armouring wires is taken up by the sleeve casing as a pressure in the axial direction.

One mode of carrying the invention into effect is illustrated, by way of example, in the accompanying drawing.

1 is the thick-walled pressure-protecting casing, in the conical end-piece of which the cable core 2 together with the profile wire tube 4 which supports the lead sheathing 3 is inserted. The lead sheathing of the cable is connected with the lead sheathing of the pressure-protecting casing of the sleeve. A hollow cone 5 is placed over the lead sheathing, over which cone the armouring wires 6 of the left-hand cable end are led in such a manner that they conform to the shape of the cone. The labyrinth guides 8 for the ends of the armouring wires 9 of the right-hand cable end are secured to the cone by means of screw bolts 7. A short conical tube 10 is secured to the hollow cone 5, which tube encloses the armouring wires of the left-hand cable end and presses them onto the hollow cone 5. Similar devices are provided on the right-hand sleeve end for guiding the armouring wires of the right-hand cable end and for securing the armouring wires of the left-hand cable end. In order to secure a predetermined curvature for the cable, funnel-shaped sleeve heads 11 are provided at the sleeve ends, which heads are connected together by a guiding cylinder 12. Moreover, articulated movable hollow cones may be placed on the sleeve heads, in order to limit the curvature of the cable. For the sake of simplicity they have not been shown on the drawing.

What I claim is:—

Junction sleeve for deep sea cables having armouring wires comprising in combination a pressure-protecting casing having conical ends, hollow cones on the conical ends of the pressure-protecting casing, the armouring wires of each cable end being led over the hollow cone at the respective end in contact therewith and over the pressure-protecting casing to the opposite end, and means for securing the armouring wires at the opposite ends to the respective hollow cones.

In testimony whereof I have signed my name to this specification.

VIKTOR THIEL.